2,767,237

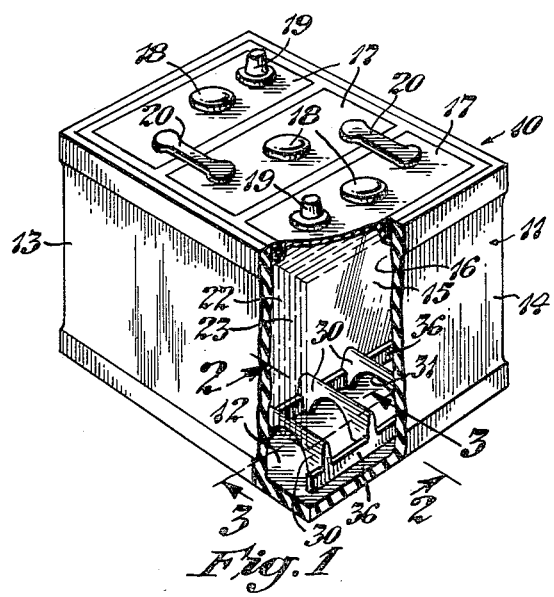

ELECTRIC STORAGE BATTERY

Carl Gritman, Sunland, Calif., assignor to Electro-Acid Corporation, Houston, Tex., a corporation of Texas Application April 14, 1953, Serial No. 348,678

1 Claim. (Cl. 136—79)

This invention relates to electric storage batteries and is concerned more particularly with an improved means by which the grid plates and their associated separator plates are supported within the cells of the battery case or jar.

One object of the present invention is to provide in an electric storage battery, means for supporting the grid plates and associated separator plates in upright position within the compartments or cells of the battery case. A related object is to provide supporting means which are designed particularly to promote the maximum degree of circulation of the electrolyte to all portions of the surface areas of all of the several grid plates, thereby adapting the battery to operate at a maximum electrical load over longer periods of time than batteries of conventional types.

Another object of the invention is to provide plate-supporting ribs or bridges which are made as separate elements, independently of the battery case, and readily installable within the cells of the battery case. By thus providing the supporting ribs as separate entities, it is possible to locate the circulation openings lowermost, that is, adjacent the bottom of the battery case, such coring of the openings in the supporting ribs of conventional molded battery cases being impractical, if not impossible.

Another object of the invention is to provide means for facilitating the installation of several such supporting ribs within a cell of the battery case and for retaining the ribs in erect position and in properly spaced relation. According to the invention, this means comprises a pair of bars or side members to which the ends of the ribs are joined, said members resting upon the bottom wall of the battery case. Preferably, although not essentially, the ribs and side bars are molded integrally from rubber, or other material having dielectric properties, to provide a plate-supporting unit adapted for insertion into the battery cell.

A further object of the invention is to provide a plate supporting unit, of the character referred to, in which the ribs may be made in various heights to adapt them for use in batteries employing grid plates of different heights. A related object is to provide ribs which are so molded as to have vertically spaced, longitudinal grooves or score lines along their sides, the purpose of such grooves being to provide weakened portions along which upper portions of the ribs of maximum height can be severed or otherwise removed to reduce the ribs to lower heights for supporting grid plates of the longer or higher types.

Further objects will appear from the following description and from the drawing which is intended for the purpose of illustration only, and in which:

Fig. 1 is a perspective view of an electric storage battery, a portion of the case of which is broken away to disclose the improved plate-supporting means embodied therein;

Fig. 2 is an enlarged cross-sectional view, taken on line 2—2 of Fig. 1;

Fig. 3 is an enlarged cross-sectional view, taken on line 3—3 of Fig. 1;

Fig. 4 is a perspective view of the plate-supporting unit of this invention; and Fig. 5 is a fragmentary cross-sectional view through a plate-supporting rib of alternative construction.

Referring to Figs. 1 through 4 of the drawing in detail, the present supporting device is shown as embodied in an electric storage battery 10 which is of conventional form with the exception that it has no integral ribs or bridges within its cells for supporting the grid plates. The battery 10 includes a rectangular, box-like case 11 having a bottom wall 12, side walls 13, end walls 14 and partitions 15 extending transversely between the side walls and defining battery compartments or cells 16. The battery further includes cover elements 17 which close the individual cells 16 and are provided with the usual vent and filler plugs 18, terminal posts 19 and plate connectors or straps 20. Disposed within each cell 16 are the usual positive and negative grid plates 22 and 23 which are held in spaced relation by means of separator plates 24 of insulation material. As is usual in storage batteries, the positive grid plates 22 may be made from metallic lead, the interstices of which are filled with peroxide of lead, while the negative grid plates 23 have their interstices filled with sponge lead, the materials of the plates 22 and 23 being of a sufficiently porous nature to permit the electrolyte, dilute sulphuric acid, contained within the cells, to penetrate through the material so as to establish contact with the maximum area thereof.

The present invention is concerned particularly with means for supporting the grid plates 22, 23 above the bottom or floor 12 of the case 11 so as to provide a space adjacent the bottom for receiving material, such as particles of lead peroxide, which may dislodge from the grid plates and descend to the bottom portion of the case. In conventional battery structures, such plate-supporting means consists of a plurality of ribs or bridges molded integrally with the case and projecting upwardly from the bottom wall of the case within each of the battery cells. Such upstanding ribs are continuous, that is, without openings or passages therein connecting the receptacles between the ribs, so that the approximately 40 percent of electrolyte present in these receptacles remains stationary therein and does not recirculate to the grid plates. Due to such lack of means for replacing the electrolyte immediately adjacent the grid plates which is consumed during a period of discharge, the output efficiency of the conventional battery is materially reduced. It is the aim of this invention to provide means permitting circulation of the electrolyte from said receptacles to the grid plates so as to increase the efficiency of the battery, this means being constructed and arranged as next described.

In general, the present invention involves the use of ribs or bridges 30 which are arranged within the bottom of each battery cell 16 and upon which the grid plates 22, 23 and separator plates 24 rest. In accordance with the present concept, the tapered supporting ribs or bridges 30 are provided with relatively large openings or passages 31 in their lower edge portions. By this provision, the electrolyte present in the compartments or receptacles 32 defined by the ribs may circulate laterally and upwardly into contact with the grid plates. The openings 31, as herein shown, may be of curved outline, or they may take other shapes as desired.

While it is possible to simply place the plurality of rib elements 30 within the cells and to rely upon the weight of the grid plates to retain the elements in place, it has been determined that the ribs can be more accurately spaced and retained in position when they are connected, one to another. In view of this fact, the invention contemplates the provision of a plate-supporting unit 35 of the type illustrated best in Fig. 4. As shown, the unit 35 includes a pair of spaced, parallel side bars 36 adapted to rest upon the bottom wall 12 of the battery cell 16.

Extending between the bars 36, with their ends joined thereto are the plate-supporting ribs or bridges 30. While it is possible to connect the ribs 30 to the side bars 36, as by vulcanizing or cementing them thereto, a more practical unit is provided when the side bars and ribs are molded integrally from rubber or composition material of a dielectric nature. In any event, it is desirable that the ribs 30 extend throughout substantially the full width of the battery cell and for this reason the ends of the ribs overlap the side bars 36, as indicated at 37.

The plate-supporting devices or units 35 are inserted into the battery cells 16 during the constructing of the battery by simply sliding them downwardly into the cells to cause them to rest upon the bottom wall 12. With the supporting units 35 so placed within the cells, the grid plates 22, 23 and separator plates 24 may be installed in the usual manner to rest upon the ribs 30, after which assembling of the other parts of the battery is effected.

Storage batteries are made in a large variety of sizes and capacities to meet the various requirements, one of the variables being the height of the grid plates. That is to say, in order to increase the amp. hr. rate, grid plates of increased height are employed for obtaining greater surface area. In order to compensate for variations in the height of the grid plates, the rib portions 30 of the supporting unit 35 may be made of the appropriate height to accommodate the particular grid plates used.

However, since the providing of supporting units 35 having ribs of different heights may involve the use of several molds having cavities of different depths, the present invention contemplates a unit having modified ribs 30' of the character illustrated in Fig. 5. As shown, each rib 30' is provided with vertically spaced, longitudinally extending, shallow grooves or score indentations 40 and 41, each rib further being provided with the circulation opening 31.

When the unit 35 is to be used in a battery to support grid plates 22A of minimum height, the full vertical extent of the ribs 30' is utilized, in which case the plates 22A rest upon the upper extremities of the ribs as shown by the full line. In the event that the use of grid plates 22B of medium height is contemplated, the portion of the ribs 30' above the upper score lines 40 are removed by simply breaking them off with a suitable cutting tool. The ribs 30' of medium height then are capable of supporting the grid plates 22B, as indicated by the dot-and-dash line in Fig. 5. When the ribs 30' are to support grid plates 22C of maximum length, the portions of the ribs between the score lines 40 and 41 are severed from the ribs, thus leaving ribs of minimum height upon which the plates 22C rest as designated by the dash line in Fig. 5. Thus, by the simple expedient of supporting ribs adjustable in height, the same supporting unit may be utilized in connection with batteries employing grid plates of different heights.

In practice, a grid separator 24 is disposed between each two adjacent plates 22, 23, these separators being of dielectric material, such as wood, spun glass or hard rubber, said separators guarding against the occurrence of electric contact between any two adjacent plates, which might develop in the event of warping or displacement of any of the grid plates. In accordance with the usual practice, the grid separators have corrugations providing vertical channels through which the electrolyte can circulate freely. Inasmuch as operation of a storage battery is accompanied by a rise in temperature of its grid plates, a thermo-siphonic action is developed wherein the electrolyte tends to rise within the channels of the separator plates, flowing out from between the grid plates at their upper edges, after which the electrolyte flows horizontally to the spaces existing between the vertical edges of the grid plates and the side walls of the battery case. The electrolyte then passes downwardly through said spaces to the compartments or chambers 32 defined by the bottom edges of the grid plates, the bottom wall of the battery case and the upstanding ribs 30.

By providing the openings 31 in the supporting ribs 30, fluid communication is established between each two adjacent chambers 32 so that the electrolyte is free to circulate therethrough in such a manner as to enhance the completion of the cycle of circulation promoted by the thermo-siphonic action referred to above. Such freedom of circulation not only tends to maintain the battery cool by dissipating heat from the grid plates as it develops, but it also tends to increase the efficiency of the battery in delivering electric energy by keeping all surfaces of all grid plates supplied with a fresh supply of electrolyte. This not only increases the efficiency of the battery in delivering electric energy, but it also permits charging the battery at an increased rate, without unduly increasing the liability of damaging the battery's plates, because the tendency of the circulating fluid is to remove the heat from the grid plates as fast as it is developed.

By the present improved structure, the battery will recuperate at a faster rate and last longer when run down or exhausted from a rapid rate of discharge. This highly desirable result is attributed to the fact that the free fluid circulation immediately draws upon the reserve supply of acid within the lower part of the battery case to provide a new supply of energy in a matter of a few seconds. Also, the free circulation feature of the present improved battery improves the performance of the battery in sub-zero weather since it furnishes the plates of the battery with extra energy provided by the fresh supply of electrolyte, at a much faster rate than is possible in conventional batteries.

Excessive heat normally is the greatest destroyer of battery life. However, by the present means for creating full circulation of the electrolyte, dissipation of the heat is enhanced, the free circulation of low density electrolyte greatly prolonging the life of the battery by providing maximum internal cooling efficiency.

As another important feature of the invention, the openings effecting circulation of the electrolyte are formed in the extreme lower portions of the plate-supporting ribs so as to make use of the full reserve supply of acid present in the bottom of the battery cells. Locating of the circulation openings or passages in the lowermost portions of the ribs is made possible by making the ribs as separate entities, insertable into the battery cells, it being apparent that the coring of such passages in the integrally molded ribs of conventional battery cases would be extremely difficult, if not impossible. Another important consideration is the fact that the ribs for each cell are incorporated in a unitary structure insertable into the cell, thus providing the strength and rigidity necessary to support the heavy grid plates. As a further feature, the invention provides supporting ribs, the height of which may be altered to meet the requirements, thus avoiding the necessity for providing ribs of several different heights.

In accordance with the provisions of the patent statutes, I have described the principle of operation of the battery, together with the constructions which I now consider to represent the best embodiments of the invention. I wish it to be understood, however, that various modifications might be made in the construction, within the spirit and scope of the appended claim.

I claim as my invention:

A unit for supporting the grid plates of an electric storage battery, consisting of a pair of parallel side bars, and a plurality of ribs integral with and extending between said side bars, each of said ribs projecting above the side bars and each having a broad opening in its lower edge and having vertically spaced longitudinal grooves on the sides thereof providing weakened portions facilitating removal of the upper edge portions of the rib so as to adapt the height thereof to the battery plates to be supported thereby.

References Cited in the file of this patent
UNITED STATES PATENTS 1,354,256  Ivey et al. _____ Sept. 28, 1920

OTHER REFERENCES

Pamphlet of Gould Storage Batteries, April 1949, page 6; and of June 1949, page 66.